June 9, 1925. 1,541,667
G. B. SOUTHWARD ET AL
CAR RETARDER
Filed Jan. 24, 1925  2 Sheets-Sheet 2
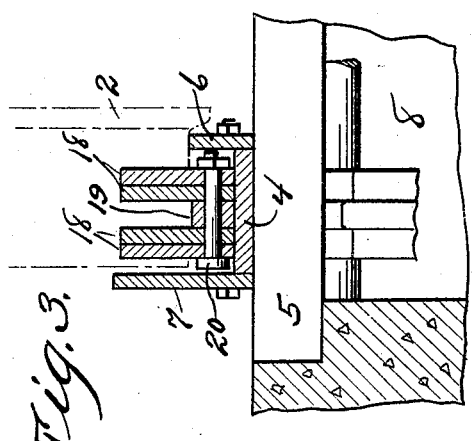
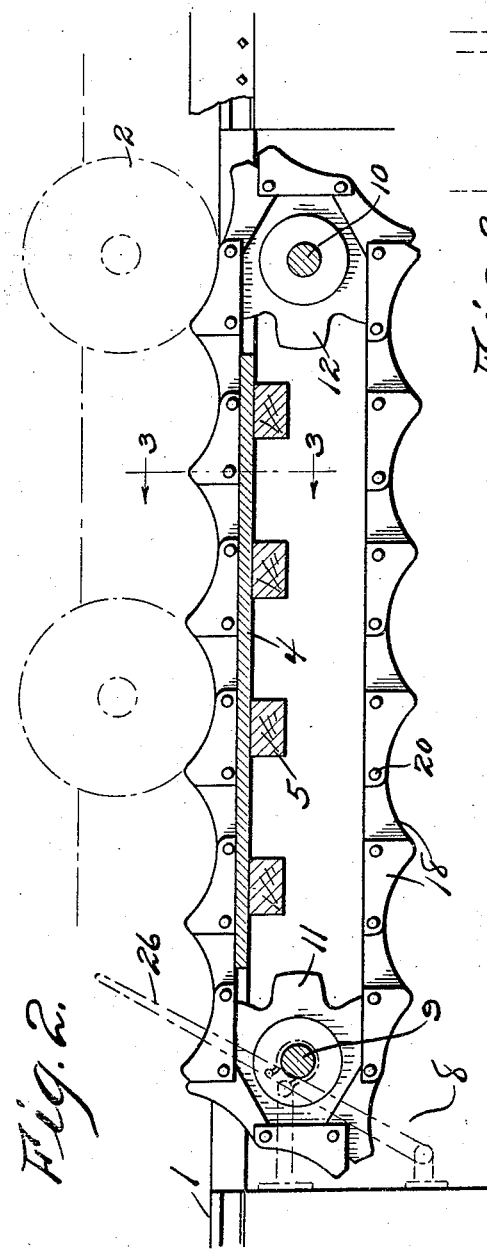
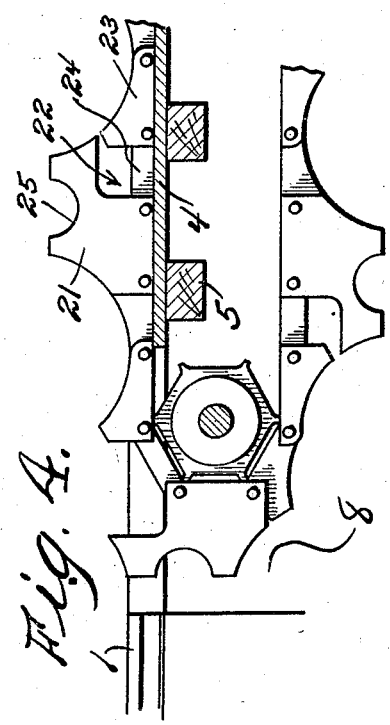
Inventors
G. B. Southward
C. O. Gallaher
By Victor J. Evans
Attorney
Witness Patented June 9, 1925.

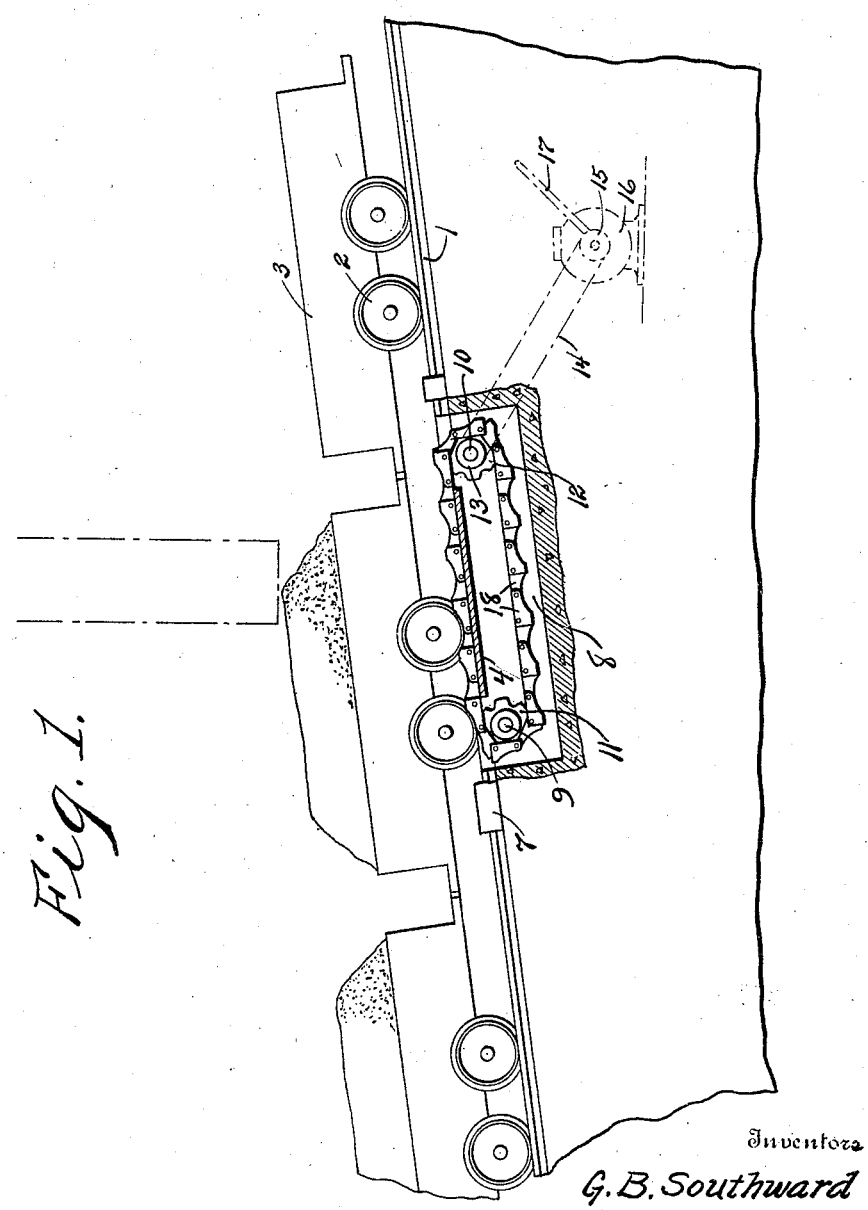

1,541,667

UNITED STATES PATENT OFFICE.

GLENN B. SOUTHWARD, OF ELKINS, AND CLYDE O. GALLAHER, OF COALTON, WEST VIRGINIA.

CAR RETARDER.

Application filed January 24, 1925. Serial No. 4,595.

*To all whom it may concern:*

Be it known that we, GLENN B. SOUTHWARD and CLYDE O. GALLAHER, citizens of the United States, residing at Elkins and Coalton, in the county of Randolph and State of West Virginia, have invented new and useful Improvements in Car Retarders, of which the following is a specification.

Our present invention has reference to a means for retarding a car for the loading, weighing or dumping of said car.

A further object is the provision of means whereby a dump or like car will be caused to travel on to a retarding device arranged in a space between rails of a track on which the car moves, and in which the said retarding means comprise wheel receiving cradles each of a breakable construction and mounted so that the cradles will open at the ends of the said means to respectively receive therein and discharge therefrom wheels of a car, means being provided for imparting a longitudinal motion to the cradles when desired, and means being likewise provided for stopping such movement of the cradles when the car is to be retained on the retarding means.

A still further object is the provision of means for retarding a car which comprises an endless chain guided between spaced rails of a track on which the car moves, the connecting pairs of links of said chain having their ends widened and their outer edges concaved to describe sectional car wheel receiving cradles therebetween, the chains being mounted so that the cradles at the ends of the chain will open to respectively receive therein and to discharge therefrom the wheels of the car, motor operated means being provided for imparting motion to the endless chains, and brake means being associated with said motion imparting means for stopping and for regulating the speed of the latter.

With the above broadly stated objects in view and others which will present themselves as the nature of the invention is better understood, reference is to be had to the drawings which accompany and which form part of this application.

In the drawings:—

Figure 1 is a side elevation of the improvement, parts being broken away.

Figure 2 is an approximately central vertical longitudinal sectional view through the retarder.

Figure 3 is a sectional view on the line 3—3 of Figure 2.

Figure 4 is a fragmentary view substantially similar to Figure 2, but illustrating a slight modification.

The approach to the retarder is slightly down grade, but the discharge therefrom may be down grade, level or even up grade.

The rails of a track are indicated in the drawings by the numeral 1, and on these rails the wheels 2 of cars 3 travel. The rails of the track, at one or more desired points, are spaced away from each other, and in this space there is arranged our car retarder.

The retarder includes a guide arranged in the gap between the confronting ends of the respective rail sections. The guide comprises a base plate 4 suitably mounted on transverse beams 5 embedded in the ground surface provided by the gap. To the edges of the base plate 4 there are secured inner vertical plates 6 and outer vertical plates 7. The plates 7 are of a greater width than the plates 6, and the tread surfaces of the wheels may rest directly on the upper edges of the said plates 6. Below the beams or ties 5 there is an excavation providing a longitudinal pocket 8 and in this pocket, at the ends thereof, there are journaled transversely arranged shafts 9 and 10 respectively. These shafts are disposed a slight but sufficient distance away from the base plates 4 of the guides and have secured thereon sprocket wheels 11 and 12 respectively. The shaft 10 has also secured thereon a wheel 13 over which is trained an endless element 14, which may be in the nature of a chain or belt, the said element being also trained around a pulley wheel 15 on a motor 16. The brake for the pulley wheel is indicated in Figure 1 by the numeral 17.

Trained around the sprocket wheels 11 and 12 are the endless chains that comprise the retarder. These chains are preferably made up of inner and outer pairs of links 18 between whose ends there are preferably arranged spacer blocks 19, and pivots 20 pass through the ends of the said links and through the spacer blocks 19. The links 18 have their outer ends widened, and each pair of centrally pivoted links has its outer edge rounded downwardly from its said widened end to its pivoted end, so that each pair of the said links thus provides a concaved cradle for the wheels 2 of the cars 3. It is obvious that incident to the travel of the links over the sprocket wheels, the end links of the cradle will break, thus permitting the wheels of the car to be effectively received in the broken cradles at one end of the retarder, and likewise causing the broken links at the opposite end of the retarder to exert a shove or pressure against the wheels of the car to move the same off of the retarder. Of course, the car is held from movement when its wheels are received in the cradle and to move the car to the proper position to receive the load, as indicated in Figure 1 of the drawings, or to deliver a load or for the weighing of the car (in which instance the retarder is associated with the weighing means), the motor is put into operation.

In Figure 4 of the drawings, we have illustrated a slightly modified form of retarder chains, in which the end links 21 are wider than the links 18, the said links having their outer edges rounded downwardly. These links have one of their lower corners cut-away, as at 22, to provide a space or pocket for the reception of a comparatively short link 23 which is connected to the links 21 by block members 24. For the sake of lightness the upper edges of the links 21 may be concaved, as at 25. The operation of this form of retarder is similar to that above described and such form of retarder is employed upon a comparatively steep grade or when the weight of the cars is greater than usual.

In the weighing operation, the cars are uncoupled, but during the loading or dumping operation, this is not necessary.

It may be found desirable to provide a braking means on one of the shafts 9 or 10, and therefore in Figure 2 of the drawings, we have shown a lever operated braking means for the shaft 9, the said means being broadly indicated by the numeral 26.

The invention is, of course, susceptible to such changes as fall within the scope of what we claim.

Having described the invention, we claim:—

1. A retarding means for a car arranged in a gap between the rails of a track on which the car travels and operable to receive and hold the wheels of the car thereon, and further operable to move the car thereover.

2. A means for retarding a car arranged in a gap between the rails of a track on which the car travels, and comprising endless elements having means for receiving and holding the wheels of the car thereon, and means for imparting a longitudinal movement to the elevator.

3. A means for retarding a car arranged in a gap between the rails of a track on which the car travels, and comprising endless elements having means for receiving and holding the wheels of the car thereon, means for imparting a longitudinal movement to the elevator, and braking means for said endless elements.

4. A means for retarding a car arranged in a gap between the rails of a track on which the car travels, and comprising endless chains, guides therefor in a line with the rails of the track, means integral with the links of the chains for engaging the opposite sides of the tread portions of the car wheels, means for imparting a longitudinal movement to the chains, and brake means for regulating such movement.

5. A means for retarding a car arranged in a gap between divided rails of a track on which the car travels, comprising endless chains guided between the spaced rails of the track, the connected pairs of links of said chains having their ends widened and their outer edges concaved to describe sectional wheel receiving cradles therebetween, and the chains being mounted so that the cradles will open at the ends of the said chains to respectively receive thereon and discharge therefrom the wheels of a car, and means for imparting a simultaneous longitudinal movement to the chains.

6. A means for retarding a car comprising an endless chain guided between spaced rails of a track on which the car moves, the links of the said chains being arranged in cooperating pairs, the ends of which being widened and the outer edges of which being rounded inwardly to provide concaved cradles for the wheels of the car, a block arranged between and pivoted to the central portion of each cradle, sprocket wheels for the chains whereby the end links of the said cradles will open to respectively receive and discharge therefrom the wheels of a car, motor operated means for imparting a simultaneous longitudinal movement to the chains, and brake means for regulating such movement.

7. A car retarding means comprising cradles in which the wheels of a car to be retarded rest, each of said cradles comprising pivotally associated links, the outer edges of which being concaved to conform to the shape of the car wheel, and the links on one end of the cable being of a greater height than those on the other end of the cradle.

In testimony whereof we affix our signatures.

GLENN B. SOUTHWARD.
CLYDE O. GALLAHER.